(12) United States Patent
Renders et al.

(10) Patent No.: US 7,408,717 B2
(45) Date of Patent: Aug. 5, 2008

(54) LIQUID-BASED OPTICAL DEVICE, METHOD FOR CONTROLLING SUCH A DEVICE AND ELECTRONIC DEVICE

(75) Inventors: Christina A. Renders, Eindhoven (NL); Stein Kuiper, Vught (NL); Bernardus H. W. Hendriks, Eindhoven (NL); Ivon F. Helwegen, St. Odilienberg (NL); Marco A. J. Van As, Waalre (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 11/568,123

(22) PCT Filed: Apr. 22, 2005

(86) PCT No.: PCT/IB2005/051321

§ 371 (c)(1),
(2), (4) Date: Aug. 1, 2007

(87) PCT Pub. No.: WO2005/103768

PCT Pub. Date: Nov. 3, 2005

(65) Prior Publication Data

US 2007/0279757 A1    Dec. 6, 2007

(30) Foreign Application Priority Data

Apr. 24, 2004  (GB)  ................................ 0409204.5
Nov. 2, 2004   (GB)  ................................ 0424291.3

(51) Int. Cl.
*G02B 1/06* (2006.01)

(52) U.S. Cl. ...................... 359/665; 359/666; 359/667; 359/820

(58) Field of Classification Search ......... 359/665–667, 359/820
See application file for complete search history.

(56) References Cited

U.S. PATENT DOCUMENTS 4,477,158 A  *  10/1984  Pollock et al. ............... 359/666

(Continued)

FOREIGN PATENT DOCUMENTS

EP          1385036 A1    1/2004

(Continued)

OTHER PUBLICATIONS

Claude Ganay, et al: Dynamic Study of a Varioptic Variable Focal Lens, Proceedings of the SPIE, vol. 4767, pp. 159-165, XP002335406.

(Continued)

*Primary Examiner*—Evelyn A. Lester
(74) *Attorney, Agent, or Firm*—Michael E. Belk

(57) ABSTRACT

The present invention discloses an optical device comprising a container enclosing an insulating liquid (A) and an electrically susceptible liquid (B), the insulating liquid (A) and the electrically susceptible liquid (B) being immiscible and being in contact with each other via an interface (14), at least one of the liquids (A; B) being at least partially placed in a light path through the container. The optical device further comprises heating means (2, 12, 20) that preferably are responsive to a temperature sensor (30) for heating the insulating liquid (A) and the electrically susceptible liquid (B). Consequently, an optical device is obtained in which the influence of the temperature dependence of the physical properties of the insulating liquid (A) and the electrically susceptible liquid (B) on the behavior of the optical device is reduced, thus yielding an optical device with improved optical characteristics at low temperatures.

13 Claims, 3 Drawing Sheets

U.S. PATENT DOCUMENTS

Figure 1:
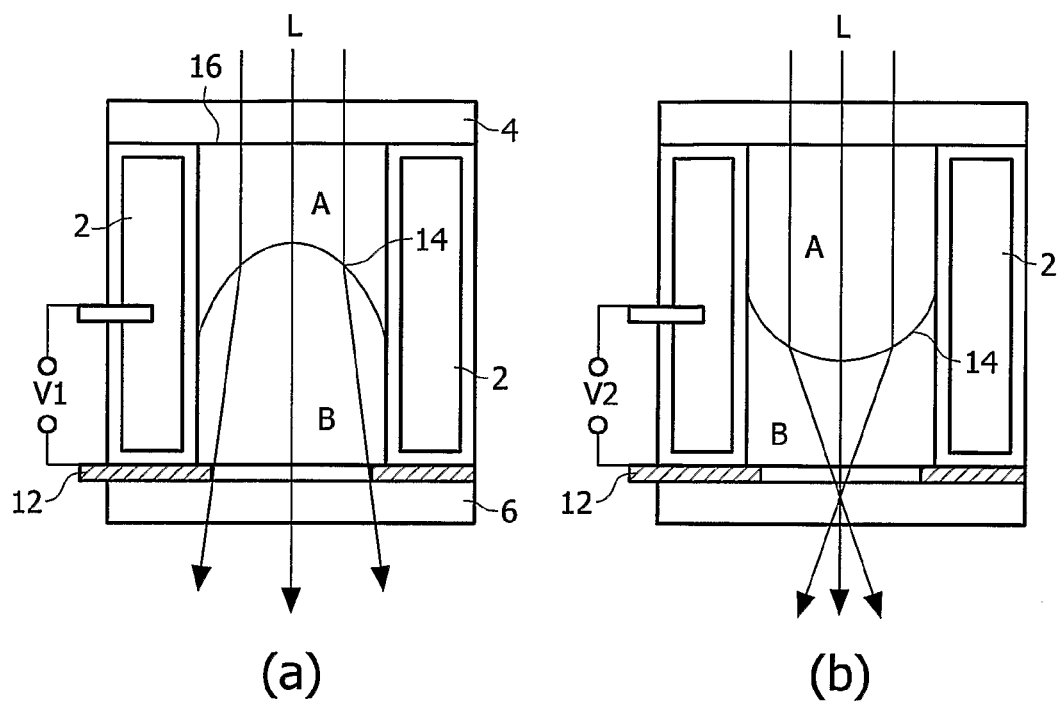

| | | | |
|---|---|---|---|
| 5,074,629 A * | 12/1991 | Zdeblick | 359/667 |
| 7,242,528 B2 * | 7/2007 | Renders et al. | 359/665 |
| RE39,874 E * | 10/2007 | Berge et al. | 359/666 |
| 7,317,580 B2 * | 1/2008 | Kogo et al. | 359/666 |
| 7,342,725 B2 * | 3/2008 | Hendriks et al. | 359/666 |
| 2001/0017985 A1 | 8/2001 | Tsuboi et al. | |
| 2002/0176148 A1 | 11/2002 | Onuki et al. | |
| 2003/0007240 A1 | 1/2003 | Blum et al. | |
| 2003/0169987 A1 | 9/2003 | Eggleton et al. | |
| 2003/0179464 A1 | 9/2003 | Amanai | |
| 2004/0007377 A1 | 1/2004 | Fouillet et al. | |
| 2006/0209422 A1 * | 9/2006 | Renders et al. | 359/665 |
| 2007/0206291 A1 * | 9/2007 | Kuiper et al. | 359/665 |

FOREIGN PATENT DOCUMENTS

| | | |
|---|---|---|
| JP | 2001249203 A | 9/2001 |
| JP | 2001249262 A1 | 9/2001 |
| WO | 03069380 A1 | 8/2003 |
| WO | 03090611 A1 | 11/2003 |
| WO | 2004102250 A1 | 11/2004 |

OTHER PUBLICATIONS

Written Opinion of the International Searching Authority PCT/IB2005/051321.

* cited by examiner

LIQUID-BASED OPTICAL DEVICE, METHOD FOR CONTROLLING SUCH A DEVICE AND ELECTRONIC DEVICE

The present invention relates to an optical device comprising a container enclosing an insulating liquid and an electrically susceptible liquid, the insulating liquid and the electrically susceptible liquid being immiscible and being in contact with each other via an interface, the liquids being placed in a light path through the container; and means for manipulating a position of the interface.

The present invention further relates to a method for controlling such an optical device.

The present invention yet further relates to an electronic device comprising such an optical device.

Optical devices based on the manipulation of liquids are rapidly gaining large commercial interest, not in the least because of their lack of mechanically moving parts and the relative simplicity of the devices, which makes the devices cheap and durable.

For instance, in US patent application US2001/0017985 an optical device is disclosed that incorporates two immiscible liquids with equal refractive indices but different transmittances, with one of the two liquids being conductive. By varying the interface between these two liquids, the amount of each of the liquids in the light path through the device is changed and a diaphragm is obtained as a result.

International patent application WO03/069380 discloses a cylindrical variable focus lens incorporating two immiscible fluids having different refractive indices, one of the fluids being conductive and the other being insulating. These fluids preferably have a comparable density to avoid a gravitational dependency of the orientation of the liquids on the orientation of the lens. The shape of the interface between the two fluids is manipulated by applying a voltage across the lens, which can be used to introduce a change in the focal point of the lens. The walls of the cylinder and one of the transparent lids of the cylinder are coated with a hydrophobic coating to ensure that at least in a switched off state the contact area between the conductive fluid, which typically is a polar liquid, and said walls is minimized to facilitate a variable focus lens with a large optical power range.

A problem with such devices when their conductive fluid typically comprises water having a relatively high electrolyte solution to enable the operation of the optical device well below 0° C. is that this gives the conductive fluid a density of well above 1 g/cm$^3$, which severely hampers the choice of a suitable insulating fluid, which typically is an oil having a density below 1 g/cm$^3$. Also, the relatively high electrolyte concentration can cause corrosion of metallic parts of the optical device that are in contact with the conductive fluid, which deteriorates its performance.

The invention seeks to provide an optical device in which a lower electrolyte concentration may be used.

The invention also seeks to provide a method for controlling such an optical device.

The invention further seeks to provide an electronic device comprising such an optical device.

According to an aspect of the invention, there is provided optical device comprising a container enclosing an insulating liquid and an electrically susceptible liquid, the insulating liquid and the electrically susceptible liquid being immiscible and being in contact with each other via an interface, at least one of the liquids being at least partially placed in a light path through the container, means for manipulating a position of the interface, and heating means for heating the insulating liquid and the electrically susceptible liquid.

The presence of the heating means that are user-controlled or that are responsive to a temperature sensor in the optical device of the present invention ensures that fluctuations in the temperature of the liquids inside the optical device can be reduced. Consequently, the densities of these liquids fluctuate less as well, which results in a better control over the elimination of gravitational distortion of the orientation of the liquids. This better control over the temperature fluctuations also solves a problem that is associated with oil-based insulating liquids, which become very viscous at operating temperatures in the low end of the operational range of the optical device, thus reducing the detrimental effect that the increasing viscosity has on the switching speed of the optical device.

Similarly, since the refractive index of a liquid is temperature-dependent, large changes in temperature can cause a deviation from the intended optical behaviour of the optical device.

Furthermore, cooling down of the liquids results in a volume decrease of the liquids and hence causes a decrease in pressure. Consequently, vapour bubbles or bubbles of dissolved gas can occur in the liquids, which detonate the optical performance of the optical device. The control of the temperature of the liquids inside the optical device provided by the present invention ensures an improved stability of the optical properties of the optical device.

In addition, the optical device of the present invention allows for a lower electrolyte concentration in the electrically susceptible liquid being a electrolyte-based conductive liquid, because the electrically susceptible liquid is protected from freezing by the presence of heating means coupled to a temperature sensor. Consequently, the electrolyte-induced corrosive degradation of metal parts in the optical device that are in contact with the electrically susceptible liquid is reduced. Furthermore, since the density of an electrolyte-based liquid increases with an increasing electrolyte concentration, the optical device of the present invention allows for a lower density of this liquid, thus facilitating the choice for an insulating liquid having a matching density.

Although the heating means may be operated manually, it is preferable that the optical device further comprises a temperature sensor, with the heating means being responsive to said temperature sensor. This ensures a constant protection of the optical device without the user of the device having to pay attention to the temperature to which the optical device is exposed.

In an embodiment, the heating means comprises driver circuitry for providing at least a part of the means for manipulating a position of the interface with an electric current. The electric current, which may be a constant current provided to an electrode during an idle state of the optical device, causes resistive heating of the walls of the container of the optical device carrying the means for manipulating a position of the interface. This has the advantage that the temperature of the optical device can be controlled using the already available means for manipulating a position of the interface.

In another embodiment, the heating means comprise a layer of a conductive material covering at least a part of the container. The use of a conductive material dedicated to heating purposes has the advantage that it can be used during operation of the optical device, when the means for manipulating a position of the interface are engaged thereto.

According to another aspect of the invention, there is provided a method of controlling an optical device according to the opening paragraph, the method comprising the steps of determining a temperature of the insulating liquid and the electrically susceptible liquid; comparing the determined temperature with a predefined temperature threshold; and heating the insulating liquid and the electrically susceptible liquid if the determined temperature is below said threshold.

With this method, it is ensured that the temperature inside the optical device does not drop below a predefined temperature, which is typically a temperature below which the properties of the liquids, e.g., density, viscosity and refractive index deviates too much from their intended properties, thus avoiding the aforementioned detrimental effects to the performance of the optical device.

In an embodiment, the step of determining the temperature comprises switching the interface from a first position to a second position, and measuring a response time of the interface. This embodiment is based on the realization that the response time of the optical device to a change in interface position is temperature-dependent. Consequently, the determination of this response time is an implicit temperature measurement, which has the advantage that no dedicated temperature sensor is required; this measurement can for instance be performed with an image sensor in the case of the optical device implementing a lens function or with a light sensor or an image sensor in the case of the optical device implementing a diaphragm function. Subsequently, the step of heating the insulating liquid and the electrically susceptible liquid may comprise providing at least a part of the means for manipulating a position of the interface with an electric current, which has the advantage that the heating step can be executed without the need for additional elements in the optical device.

According to yet another aspect of the invention, there is provided an electronic device comprising an optical device according to the opening paragraph, the electronic device further comprising driver circuitry coupled to the means for manipulating a position of the interface and a temperature sensor coupled to the driver circuitry. The driver circuitry and temperature sensor do not have to be integrated in the optical device but may also be present in the electronic device of the present invention. This has the advantage that if such elements are already present in the electronic device, their functionality can be extended to implement the desired temperature control of the optical device. For instance, if the electronic device includes a liquid crystal display, the driver circuitry for this display may already include a temperature sensor, which can be also be used for the optical device.

Alternatively, the electronic device further comprises an optical sensor with the temperature sensor being implemented in the optical sensor. As explained in the method of the present invention, the optical sensor can be used to measure a response time of the optical device, which can be correlated to a temperature of the liquids. This has the advantage that no dedicated temperature sensor is required.

The driver circuitry may be further arranged to provide at least a part of the means for manipulating a position of the interface with an electric current responsive to the temperature sensor, which has the advantage that no additional driver circuitry is required as the control part for the heating means.

In a further embodiment, the optical device further comprises a layer of a conductive material covering at least a part of the container, the conductive layer being coupled to the driver circuitry, the driver circuitry being further arranged to provide the layer of conductive material with an electric current responsive to the temperature sensor. This has the advantage that the conductive material, which serves as heating means of the optical device, can be used at the same time as the means for manipulating a position of the interface, thus allowing heating of the optical device during operation.

Figure 2:
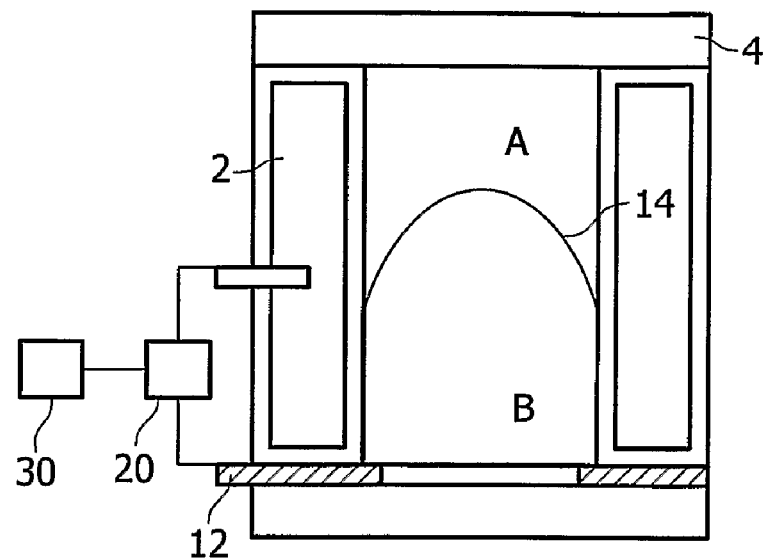
Figure 3:
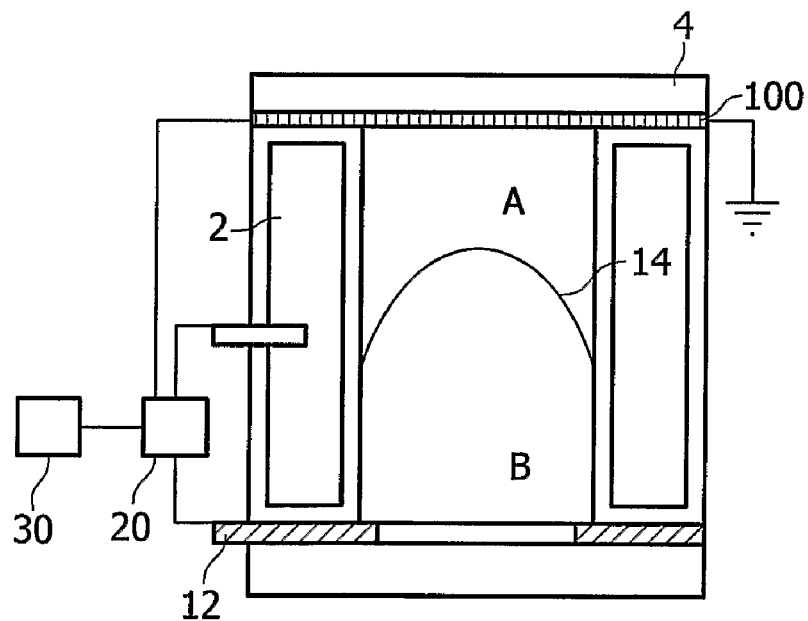
Figure 4:
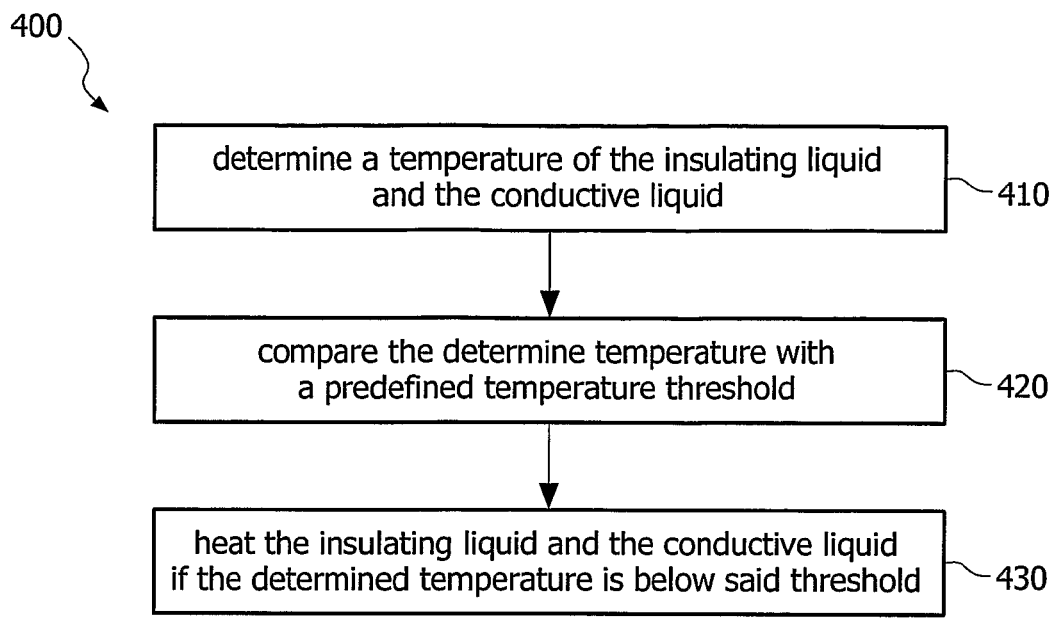
Figure 5:
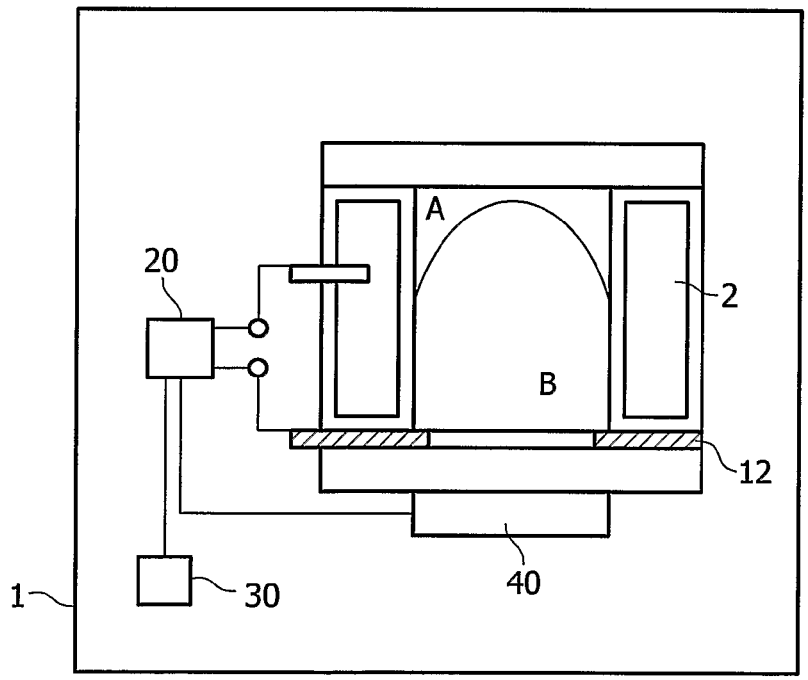

The invention is described in more detail and by way of non-limiting examples with reference to the accompanying drawings, wherein:

FIG. 1 schematically depicts a prior art variable focus lens;

FIG. 2 schematically depicts an optical device according to the present invention;

FIG. 3 schematically depicts another optical device according to the present invention;

FIG. 4 schematically depicts an electronic device according to the present invention; and FIG. 5 schematically depicts another electronic device according to the present invention.

It should be understood that the Figures are merely schematic and are not drawn to scale. It should also be understood that the same reference numerals are used throughout the Figures to indicate the same or similar parts.

In FIG. 1, a variable focus lens as disclosed in International Patent application WO 03/069380 is shown. The variable focus lens comprises a first fluid A and a second fluid B housed in a cylindrical chamber. The fluids are immiscible, have different refractive indices and preferably have the same density to avoid orientation-dependent gravitational effects on the orientation of the fluids including the interface 14 between the fluids. The cylindrical chamber further comprises a first end portion 4 and a second end portion 6, with the first end portion 4 as well as the inner walls of the cylindrical chamber being covered by a hydrophobic coating such as AF1600™ from the DuPont company, which may be combined with a parylene stack, to confine the conductive fluid B by the insulating fluid A in the absence of an applied voltage. The shape of the interface 14 can be switched in a continuous fashion from a convex shape shown in orientation (a) to a concave shape shown in orientation (b) by varying a voltage from a value V1 to a value V2 across the cylindrical electrode 2 embedded in the chamber wall and a, preferably transparent, annular electrode 12 on the second lid 6 which is in conductive contact with the second fluid B. Consequently, the focal point of the light path L through the cylinder is altered.

The transparent end portion 4 may be a glass or polymer lid or another suitable transparent material, which may be lens-shaped.

Typically, the temperature dependence of the physical properties of the insulating fluid A will differ from the temperature dependence of the physical properties of the conductive fluid B. Therefore, fluids A and B may have well-matched physical properties at a chosen temperature, e.g., room temperature, but if the operational temperature of the lens significantly deviates from this chosen temperature, this different temperature-dependent behaviour can cause a deviation from the intended match in physical properties.

For instance, the insulating fluid A and the conductive fluid B may have similar densities around T=20° C. to avoid a gravitational influence on the orientation of the fluids. However, when operating at T=−20° C., the densities may have become sufficiently different to cause the orientation of the fluids to become influenced by gravity, which means that the performance of the lens becomes dependent on the orientation in which it is placed, which is highly unwanted.

Also, the carefully chosen difference in refractive index between the insulating fluid A and the conductive fluid B can be altered by a large shift in temperature, causing a deviation from the desired optical behaviour of the lens. Furthermore, the insulating fluid A may be oil-based. At low temperatures, an oil-based fluid can become very viscous, which has a detrimental effect on the switching speed of the variable focus lens.

It is emphasized that although these undesirable effects are explained using the prior art lens from International Patent application WO 03/069380 as an example, other liquid-based optical devices such as the diaphragm disclosed in US patent application US2001/0017985 can also suffer from at least some of these problems.

In FIG. 2 and the following figures, the variable focus lens of FIG. 1 will be shown as an embodiment of the optical device of the present invention. It is emphasized, however, that the teachings of the present invention also apply to other liquid-based optical devices. In FIG. 2, the variable focus lens is extended with driver circuitry 20, which is arranged to provide the electrode arrangement including wall electrode 2 and bottom plate electrode 12 with a voltage to control the shape of the interface 14 between the electrically susceptible liquid B and the insulating liquid A. The driver circuitry 20 is further arranged to provide at least one of the electrodes 2 and 12 of the electrode arrangement with an electric current responsive to a temperature sensor 30. The application of the electric current through the wall electrode 2 and/or the bottom plate electrode 12 causes resistive heating of the wall of the container of the variable focus lens, thus causing the heating of the insulating liquid A and the electrically susceptible liquid B.

In one embodiment, the provided current is a direct current, causing resistive heating of, e.g. the wall electrode 2. In another embodiment, the driver circuitry 20 is arranged to provide an alternating current to invert the charge distribution on the capacitor formed by the conductive fluid B, an insulating layer on the inner wall of the chamber, e.g. a parylene stack, and the wall electrode 2, which causes heating of the insulating layer. Advantageously, the alternating frequency of the alternating current is higher, and preferably, substantially higher than the response time of the interface 14 to a voltage change; e.g. in the range of 5-50 kHz. This facilitates heating of the optical device during active mode, because the voltage variations are too fast for the interface 14 to respond to.

The temperature sensor 30 may be any known temperature sensor, and is preferably but not necessarily located in close contact with the container of the variable focus lens. The temperature sensor 30 may be omitted and replaced by a user-controlled activation of the driver circuitry 20 to provide the electric current.

FIG. 3 shows another embodiment of an optical device of the present invention. The variable focus lens shown in FIG. 2 is extended with a transparent conductive layer 100 on an end portion 4 of the container of the variable focus lens. The transparent conductive layer 100 may be an indium tin oxide (ITO) layer, or another suitable transparent conductive material. In FIG. 3, the driver circuitry 20 is conductively coupled to the transparent conductive layer 100 for providing an electric current to this layer. This will generate resistive heating in the transparent conductive layer 100, thus causing the heating of the insulating liquid A and the electrically susceptible liquid B. The presence of a conductive layer 100 dedicated to the heating of the optical device has the advantage that the device can also be heated while in operation, because the wall electrode 2 and the bottom plate electrode 12 do not have to perform a dual function, i.e., controlling the shape of the interface 14 and heating the insulating liquid A and the electrically susceptible liquid B.

It is emphasized that the conductive layer 100 does not necessarily have to be located on the end portion 4. Location on other parts of the container is equally feasible. Also, the conductive layer 100 does not have to be transparent when placed outside the light path through the container. In addition, the driver circuitry 20 may include a dedicated driver circuit coupled to electrode arrangement for controlling the shape of the interface 14 and another dedicated driver circuit for providing the electric current to the conductive layer 100.

At this point, it is emphasized that in the context of the present invention, the phrase 'an electrically susceptible liquid' is intended to include conductive liquids, polar liquids and polarizable liquids.

Furthermore, it is emphasized that although in this application the means for manipulating the position of the interface 14 are depicted as an electrode arrangement for controlling the shape of the interface 14 by means of a voltage, other means for manipulating the position of the interface 14 are equally acceptable, as for instance described in unpublished European patent application 03101335.2 with priority date 14 May 2003. In this application, a variable focus lens is disclosed including two immiscible liquids with different refractive indices. The lens has two chambers over which the two liquids are distributed: a first chamber in which the interface is positioned and through which the light path runs, and a second chamber having two connections to the first chamber. The second chamber includes a pump, which is used to alter the respective volumes of the liquids in both chambers. Consequently, the focus of the lens is varied by a translation of the position of the interface between the two liquids with respect to the inner wall of the first chamber rather than by changing the shape, i.e., the curvature of the interface.

The optical devices shown in FIG. 2 and FIG. 3 may be operated according to the method 400 of the present invention for controlling an optical device comprising a container enclosing an insulating liquid A and an electrically susceptible liquid B, the insulating liquid A and the electrically susceptible liquid B being immiscible and being in contact with each other via an interface 14, at least one of the liquids A; B being at least partially placed in a light path through the container, the optical device further comprising means for manipulating a position of the interface 14. The method 400 comprises a number of steps, shown in FIG. 4.

In a first step 410, a temperature of the insulating liquid A and the electrically susceptible liquid B is determined. This may be done using a dedicated temperature sensor such as the temperature sensor 30. The temperature may be determined by placing the temperature sensor 30 in close vicinity to the insulating liquid A and the electrically susceptible liquid B, or by measuring a temperature outside the optical device and derive a temperature for the insulating liquid A and the electrically susceptible liquid B from this temperature.

Alternatively, the temperature of the insulating liquid A and the electrically susceptible liquid B is derived from the optical behaviour of the optical device. It has been explained that the physical properties of the insulating liquid A and the electrically susceptible liquid B are closely linked to the optical behaviour of the optical device. Since these properties are temperature dependent, a change in the optical behaviour of the optical device is an indication of the temperature of the insulating liquid A and the electrically susceptible liquid B.

For instance, the interface 14 may be switched from a first position to a second position. The response time of the interface 14, i.e., the time it will take the interface 14 to reach a stable position, is a function of temperature of the insulating liquid A and the electrically susceptible liquid B; therefore, measuring this response time will provide the temperature of the insulating liquid A and the electrically susceptible liquid B. This response time can be measured with an optical sensor such as an image sensor by analyzing when upon changing the shape of the interface 14 the output of the optical device becomes stable again. In case of the optical device being a diaphragm, this can also be done with a light sensor, in which case the stabilization of the amount of light coming through the optical device is an indication of the interface 14 reaching a stable state. Alternatively, the response time can be determined by measuring the capacitance of the capacitor formed by the wall electrode 2, the insulating layer covering the wall electrode 2 and the liquid responsive to an electric field B.

In a next step 420, the determined temperature is compared with a predefined temperature. The predefined temperature typically is the lowest temperature at which the physical properties of the insulating liquid A and the electrically susceptible liquid B are still within the required specification. If the determined temperature is not lower than the predefined temperature, no heating step is required. If, however, the determined temperature is lower than the predefined temperature, a step 430 is performed in which the insulating liquid A and the electrically susceptible liquid B are heated, for instance by providing an electric current through the wall electrode 2 and/or the bottom electrode 12 of the optical device.

The steps 410 to 430 may be repeated until the temperature of the insulating liquid A and the electrically susceptible liquid B no longer lies below the predefined temperature. Alternatively, once step 410 and 420 have been executed, step 430 may be executed in parallel with steps 410 and 420 until the insulating liquid A and the electrically susceptible liquid B are warm enough.

FIG. 5 shows an embodiment of an electronic device 1 of the present invention. The electronic device includes an optical device as shown in FIG. 1 and described in the detailed description thereof. In addition, the electronic device 1 includes an image sensor 40 located at the exit side of the light path through the optical device for registering the image captured by the optical device. The image sensor 40 is coupled to driver circuitry 20 for controlling said driver circuitry, to ensure that the image captured by the optical device has the appropriate characteristics, e.g., an image being in focus in case of the optical device being a variable focus lens. The electronic device may include a temperature sensor 30, which may be a part of a driver circuit (not shown) for an active matrix liquid crystal display (AMLCD; not shown). This temperature sensor 30 can also be used to provide the driver circuitry 20 with a control signal if the measured temperature falls below a predefined temperature, in analogy with step 410 and 420 of the method 400 of the present invention. In response, the driver circuitry 20 provides at least one of the electrodes 2 and 12 with an electric current. Alternatively, the optical device may comprise a conductive layer (not shown) to which the electric current is applied.

The temperature sensor 30 may be omitted if the image sensor 40 is used to determine the temperature of the insulating liquid A and the electrically susceptible liquid B, as previously explained. The temperature determined by the image sensor 40 may also be used to control other temperature-sensitive parts of the electronic device 1, such as the aforementioned AMLCD, in which case the temperature sensor 30 can be omitted from the driver circuitry of the AMLCD.

Alternatively, the electronic device may be configured to determine the capacitance of the capacitance of the capacitor formed by the wall electrode 2, the insulating layer covering the wall electrode 2 and the electrically susceptible liquid B to determine the response time of the interface 14, because the time it takes for the capacitance to reach a stable value upon switching the interface 14 from a first position to a second position corresponds to the aforementioned response time of the interface.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. An optical device comprising:
   a container enclosing an insulating liquid (A) and an electrically susceptible liquid (B), the insulating liquid (A) and the electrically susceptible liquid (B) being immiscible and being in contact with each other via an interface (14), at least one of the liquids (A; B) being at least partially placed in a light path through the container;
   means (2; 12) for manipulating a position of the interface (14); and
   heating means (2, 12, 20, 100) for heating the insulating liquid (A) and the electrically susceptible liquid (B).

2. An optical device as claimed in claim 1, wherein the optical device further comprises a temperature sensor (30), the heating means (2, 12, 20, 100) being responsive to said temperature sensor.

3. An optical device as claimed in claim 1, wherein the heating means (2, 12, 20) comprises driver circuitry (20) for providing at least a part of the means (2; 12) for manipulating a position of the interface (14) with an electric current.

4. An optical device as claimed in claim 3, wherein the electric current is an alternating current.

5. An optical device as claimed in claim 1, wherein the heating means (20, 100) comprise a layer of a conductive material (100) covering at least a part of the container.

6. A method (400) of controlling an optical device comprising:
   a container enclosing an insulating liquid (A) and an electrically susceptible liquid (B), the insulating liquid (A) and the electrically susceptible liquid (B) being immiscible and being in contact with each other via an interface (14), at least one of the liquids (A; B) being at least partially placed in a light path through the container; and
   means (2; 12) for manipulating a position of the interface (14);
   the method (400) comprising the steps of:
      determining a temperature of the insulating liquid and the electrically susceptible liquid (410);
      comparing the determined temperature with a predefined temperature threshold (420); and
      heating the insulating liquid (A) and the electrically susceptible liquid (B) if the determined temperature is below said threshold (430).

7. A method (400) as claimed in claim 6, wherein the step (410) of determining the temperature comprises:
   switching the interface (14) from a first position to a second position; and
   measuring a response time of the interface (14).

8. A method as claimed in claim 6, wherein the step (430) of heating the insulating liquid (A) and the electrically susceptible liquid (B) comprises providing at least a part of the means (2; 12) for manipulating a position of the interface (14) with an electric current.

9. An electronic device (1) comprising:
an optical device comprising:
- a container enclosing an insulating liquid (A) and an electrically susceptible liquid (B), the insulating liquid (A) and the electrically susceptible liquid (B) being immiscible and being in contact with each other via an interface (14), at least one of the liquids (A; B) being at least partially placed in a light path through the container; and
- means (2; 12) for manipulating a position of the interface (14);
    - driver circuitry (20) coupled to the means (2; 12) for manipulating a position of the interface (14); and
    - a temperature sensor (30, 40) coupled to the driver circuitry (20).

10. An electronic device (1) as claimed in claim 9, further comprising an optical sensor (40); the temperature sensor being implemented in the optical sensor (40).

11. An electronic device (1) as claimed in claim 9, wherein the driver circuitry (20) is further arranged to provide at least a part of the means (2; 12) for manipulating a position of the interface (14) with an electric current responsive to the temperature sensor (30, 40).

12. An electronic device as claimed in claim 11, wherein the electric current is an alternating current.

13. An electronic device as claimed in claim 9, wherein the optical device further comprises a layer of a conductive material (100) covering at least a part of the container, the conductive layer (100) being coupled to the driver circuitry (20), the driver circuitry (20) being further arranged to provide the layer of conductive material (100) with an electric current responsive to the temperature sensor (30, 40).

* * * * *